United States Patent
Hou et al.

(10) Patent No.: US 12,380,270 B2
(45) Date of Patent: Aug. 5, 2025

(54) SYSTEM, METHOD, AND COMPUTER PROGRAM FOR TESTING THE ACCURACY OF SOFTWARE THAT IDENTIFIES USER INTERFACE ELEMENTS ON A WEBPAGE

(71) Applicant: Rakuten Group, Inc., Tokyo (JP)

(72) Inventors: Dennis Hou, Melbourne (AU); Bill Vasiliadis, Melbourne (AU); Travis Coulter, Vancouver (CA); Jae Jung, Melbourne (AU); Adam Roth, Sunshine Coast (AU)

(73) Assignee: Rakuten Group, Inc., Tokyo (JP)

( * ) Notice: Subject to any disclaimer, the term of this patent is extended or adjusted under 35 U.S.C. 154(b) by 34 days.

(21) Appl. No.: 18/241,782

(22) Filed: Sep. 1, 2023

(65) Prior Publication Data

US 2023/0419021 A1  Dec. 28, 2023

Related U.S. Application Data

(63) Continuation of application No. 17/566,233, filed on Dec. 30, 2021, now Pat. No. 11,775,740.

(51) Int. Cl.
*G06F 40/174* (2020.01)
*G06F 16/951* (2019.01)
(Continued)

(52) U.S. Cl.
CPC .......... *G06F 40/174* (2020.01); *G06F 16/951* (2019.01); *G06F 16/957* (2019.01);
(Continued)

(58) Field of Classification Search
CPC .............................. G06F 40/174; G06F 40/117
See application file for complete search history.

(56) References Cited

U.S. PATENT DOCUMENTS

| | | |
|---|---|---|
| 8,112,317 B1 | 2/2012 | Ballaro et al. |
| 10,229,436 B1 | 3/2019 | Fan et al. |

(Continued)

FOREIGN PATENT DOCUMENTS

| | | |
|---|---|---|
| CN | 102646095 | 8/2012 |
| JP | 2007-140982 A | 6/2007 |

(Continued)

OTHER PUBLICATIONS

Shota, Tamamura et al., "An automated testing method for input forms of Web applications", 2021 Information Processing Society of Japan, 8 pages.

(Continued)

*Primary Examiner* — Howard Cortes
(74) *Attorney, Agent, or Firm* — Lessani Law Group, PC

(57) ABSTRACT

The present disclosure relates to a system, method, and computer program for testing the accuracy of software that identifies user interface (UI) elements on a webpage ("the auto-identifier software"). The system enables a user to tag UI elements on a webpage with labels. The system creates a normalized specification for the webpage, where the specification includes a mapping of UI elements to normalized labels. The system uses the auto-identifier software to identify UI elements on the webpage. The system evaluates the performance of the auto-identifier software with respect to the webpage using the specification. The system displays diagnostics related to the performance of the auto-identifier software. In certain embodiments, the method is used for testing the accuracy of autofill software on a webform. In certain embodiments, the method is used for testing the accuracy of cart-scraper software on a checkout page.

15 Claims, 17 Drawing Sheets

(51) Int. Cl.

| | | |
|---|---|---|
| *G06F 16/957* | (2019.01) | |
| *G06F 16/958* | (2019.01) | |
| *G06F 40/117* | (2020.01) | |
| *G06F 40/169* | (2020.01) | |
| *G06F 11/32* | (2006.01) | |

(52) U.S. Cl.
CPC .......... *G06F 16/958* (2019.01); *G06F 40/117* (2020.01); *G06F 40/169* (2020.01); *G06F 11/321* (2013.01)

(56) References Cited

U.S. PATENT DOCUMENTS

| | | |
|---|---|---|
| 10,311,499 B1 | 6/2019 | Kim et al. |
| 10,614,381 B2 | 4/2020 | Hoffman et al. |
| 10,698,967 B2 | 6/2020 | Shen et al. |
| 11,068,921 B1 | 7/2021 | Engle et al. |
| 11,323,570 B1 | 5/2022 | Lamba et al. |
| 2006/0248442 A1 | 11/2006 | Rosenstein et al. |
| 2009/0177959 A1 | 7/2009 | Chakrabarti et al. |
| 2010/0191594 A1 | 7/2010 | White et al. |
| 2011/0106600 A1 | 5/2011 | Malik et al. |
| 2011/0137717 A1 | 6/2011 | Reuthe et al. |
| 2011/0153401 A1 | 6/2011 | Jellema et al. |
| 2011/0173527 A1 | 7/2011 | Zunger |
| 2012/0016862 A1 | 1/2012 | Rajan |
| 2013/0014002 A1 | 1/2013 | Cai et al. |
| 2014/0032267 A1 | 1/2014 | Smith et al. |
| 2014/0074584 A1 | 3/2014 | Fisher |
| 2014/0207872 A1 | 7/2014 | Roy et al. |
| 2014/0278880 A1 | 9/2014 | Lemphers et al. |
| 2015/0106181 A1 | 4/2015 | Kluth |
| 2016/0217484 A9 | 7/2016 | Hudson et al. |
| 2017/0185894 A1 | 6/2017 | Volkovs et al. |
| 2017/0345075 A1 | 11/2017 | Khandelwal et al. |
| 2018/0293499 A1 | 10/2018 | He et al. |
| 2018/0315069 A1 | 11/2018 | Kamireddy et al. |
| 2018/0336279 A1 | 11/2018 | Ahern et al. |
| 2019/0385185 A1 | 12/2019 | Shiffert et al. |
| 2020/0084023 A1 | 3/2020 | Bessonov et al. |
| 2020/0134698 A1 | 4/2020 | Dabral et al. |
| 2020/0159647 A1 | 5/2020 | Puszkiewicz et al. |
| 2020/0160050 A1 | 5/2020 | Bhotika et al. |
| 2020/0210511 A1 | 7/2020 | Korobov et al. |
| 2020/0320163 A1 | 10/2020 | Raiskin |
| 2020/0357012 A1 | 11/2020 | Kendall et al. |
| 2021/0044870 A1 | 2/2021 | Li et al. |
| 2021/0073846 A1 | 3/2021 | Hudson |
| 2021/0089710 A1 | 3/2021 | Chernov et al. |
| 2021/0103975 A1* | 4/2021 | Walters .................. H04L 67/535 |
| 2021/0125262 A1 | 4/2021 | Corrieri et al. |
| 2021/0182892 A1 | 6/2021 | Henderson et al. |
| 2021/0191990 A1 | 6/2021 | Shi et al. |
| 2021/0312519 A1 | 10/2021 | Sharshevsky et al. |
| 2022/0222735 A1 | 7/2022 | Senthil |
| 2022/0318791 A1 | 10/2022 | Ballenger et al. |
| 2022/0335031 A1* | 10/2022 | Eberlein ............. G06F 16/2365 |
| 2023/0018387 A1* | 1/2023 | Kuksta .................. G06F 16/954 |

FOREIGN PATENT DOCUMENTS

| | | |
|---|---|---|
| JP | 2021018601 | 2/2021 |
| WO | 2016177646 | 11/2016 |
| WO | 2020055615 | 3/2020 |
| WO | 2020061064 | 3/2020 |

OTHER PUBLICATIONS

Concise Explanation of Relevance of Cited Document 1: Shota, Tamamura "An automated testing method for input forms of Web applications", IPSJ Research Report, DCC, 2021-DCC-027, Information Processing Society of Japan, Jan. 18, 2021, [ISSN] 2188-886811, pp. 1-7; Cited Document 2: JP 2007-140982A.

Anonymous: "Automatic Extraction and Provision of Coupon Codes for Online Shopping", IP.com, Jan. 16, 2019, pp. 1-6.
Bronstein et al., "Data Fusion through Cross-modality Metric Learning using Similarity-Sensitive Hashing", 2010, pp. 1-8.
Cao et al., "Collective Deep Quantization for Efficient Cross-Modal Retrieval", Proceedings of the Thirty-First AAAI Conference on Artificial Intelligence, 2017, pp. 3974-3980.
Cao et al., "Correlation Hashing Network for Efficient Cross-Modal Retrieval", 2016, pp. 1-12.
Cheng et al., "Wide & Deep Learning for Recommender Systems", DLRS '16, Sep. 15, 2016, pp. 1-4.
Deng et al., "DeepCF: A Unified Framework of Representation Learning and Matching Function Learning in Recommender System", 2019, pp. 1-9.
Ding et al., "Collective Matrix Factorization Hashing for Multimodal Data", 2014, pp. 4321-4328.
Dong et al., "A Hybrid Collaborative Filtering Model with Deep Structure for Recommender Systems", Proceedings of the Thirty-First AAAI Conference on Artificial Intelligence, 2017, pp. 1309-1315.
Gong et al., "Learning Binary Codes for High-Dimensional Data Using Bilinear Projections", 2013, pp. 484-491.
Guo et al., "DeepFM: A Factorization-Machine based Neural Network for CTR Prediction", Proceedings of the Twenty-Sixth International Joint Conference on Artificial Intelligence, 2017, pp. 1725-1731.
He, et al., "Neural Collaborative Filtering" Proceedings of the 26th International Conference on World Wide Web (WWW'17) [online], Apr. 3, 2017, pp. 173-182.
He et al., "Neural Factorization Machines for Sparse Predictive Analytics", SIGIR '17, Aug. 7-11, 2017, pp. 355-364.
He et al., "Outer Product-based Neural Collaborative Filtering", Proceedings of the Twenty-Seventh International Joint Conference on Artificial Intelligence 2018, pp. 2227-2233.
Javkar et al., "Best Offer Recommendation Service", 2016 International Conference on Advances in Computing, Communications and Informatics, pp. 2430-2436.
Jiang et al., "Deep Cross-Modal Hashing", 2017, pp. 3232-3240.
Koren, "Factorization Meets the Neighborhood: a Multifaceted Collaborative Filtering Model", KDD 2008, Aug. 24-27, 2008, pp. 426-434.
Kumar et al., "Learning Hash Functions for Cross-View Similarity Search", 2011, pp. 1-6.
Li et al., "Deep Binary Reconstruction for Cross-modal Hashing", MM '17, Oct. 23-27, 2017, pp. 1-8.
Li et al., "Deep Collaborative Filtering via Marginalized Denoising Auto-encoder", CIKM '15, Oct. 19-23, 2015, pp. 811-820.
Li et al., "Coupled Cycle-GAN: Unsupervised Hashing Network for Cross-Modal Retrieval", Thirty-Third AAAI Conference on Artificial Intelligence, 2019, pp. 176-183.
Li et al., "Deep Heterogeneous Autoencoders for Collaborative Filtering", 2018, pp. 1-6.
Li et al., "Self-Supervised Adversarial Hashing Networks for Cross-Modal Retrieval", 2018, pp. 4242-4251.
Lian et al., "xDeepFM: Combining Explicit and Implicit Feature Interactions for Recommender Systems", KDD 2018, Aug. 19-23, 2018, pp. 1-10.
Liu et al., "Recommender Systems with Heterogeneous Side Information", WWW '19, May 13-17, 2019, pp. 1-7.
Long et al., "Composite Correlation Quantization for Efficient Multimodal Retrieval", SIGIR '16, Jul. 17-21, 2016, pp. 1-11.
Ricci et al., "Recommender Systems Handbook", 2011, 845 pages.
Sedhain et al., "AutoRec: Autoencoders Meet Collaborative Filtering", WWWWW 2015 Companion, May 18-22, 2015, pp. 1-2.
Strub et al., "Hybrid Recommender System based on Autoencoders", Workshop on Deep Learning for Recommender Systems, Sep. 2016, pp. 1-7.
Su et al., "Deep Joint-Semantics Reconstructing Hashing for Large-Scale Unsupervised Cross-Modal Retrieval", 2019, pp. 3027-3035.
Ujwal et al., "Classification-based Adaptive Web Scraper", 16th IEEE International Conference on Machine Learning and Applications, 2017, pp. 125-132.

(56) References Cited

OTHER PUBLICATIONS

Wang et al., "Collaborative Deep Learning for Recommender Systems", KDD '15, Aug. 10-13, 2015, pp. 1235-1244.

Watfa et al., "Method and System for Providing an Enhanced Online Shopping Experience to Users Through a Web Browser Extension/Mobile App", Mar. 30, 2021, pp. 1-5.

Wang et al., "Effective Multi-Modal Retrieval based on Stacked Auto-Encoders", Proceedings of the VLDB Endowment, Sep. 1-5, 2014, pp. 649-660.

Wu et al., "Quantized Correlation Hashing for Fast Cross-Modal Search", Proceedings of the Twenty-Fourth International Joint Conference on Artificial Intelligence, 2015, pp. 3946-3952.

Wu et al., "Unsupervised Deep Hashing via Binary Latent Factor Models for Large-scale Cross-modal Retrieval", Proceedings of the Twenty-Seventh International Joint Conference on Artificial Intelligence, 2018, p. 2854-2860.

Zhang et al., "Collaborative Quantization for Cross-Modal Similarity Search", 2019, pp. 1-10.

Zhang et al., "Large-Scale Multimodal Hashing with Semantic Correlation Maximization", Association for the Advancement of Artificial Intelligence, 2014, pp. 1-7.

\* cited by examiner

SIGN UP USING YOUR EMAIL ADDRESS

EMAIL ADDRESS:
ContactDetails.Emails.Email.Address

Select label text then click OK
[OK] [Manual]

LAST NAME:

PASSWORD:

Must be 6 or more characters and contain at least 1 number

DATE OF BIRTH:
[DD ⌄] [Month ⌄] [YYYY ⌄]

Tell us - you'll get a birthday treat if you do

---

Labelling | Source | Upload

Language [en ⌄]

Search parameter

PersonalDetails.FullName

PersonalDetails.Age

ContactDetails.Emails.Email.Address

ContactDetails.CellPhones.CellPhone.Number

ContactDetails.CellPhones.CellPhone.CountryCode

ContactDetails.CellPhones.CellPhone

Label Capture | Operations
[OK] [Manual] | [Reset]

SIGN UP USING YOUR EMAIL ADDRESS

EMAIL ADDRESS:

[ContactDetails.Emails.Email.Address ✓ i ⓘ ⊞]
Label='EMAIL ADDRESS'

We'll send your order confirmation here

FIRST NAME:

LAST NAME:

PASSWORD:

Must be 6 or more characters and contain at least 1 number

DATE OF BIRTH:

[DD ∨] [Month ∨] [YYYY ∨]

Tell us - you'll get a birthday treat if you do

---

Labelling | Source | Upload

Language [en ∨]

Search parameter

PersonalDetails.Age

ContactDetails.Emails.
Email.Address

ContactDetails.CellPhones.
CellPhone.Number

ContactDetails.CellPhones.
CellPhone.CountryCode

ContactDetails.CellPhones.
CellPhone

ContactDetails.LandlinePhones.
LandlinePhone.Number

Operations

[Reset]

SIGN UP USING YOUR EMAIL ADDRESS

EMAIL ADDRESS:

ContactDetails.Emails.EmailAddress
Label='EMAIL ADDRESS'

We'll send your order confirmation here

FIRST NAME:

PersonalDetails.FirstName
Label='FIRST NAME'

LAST NAME:

PersonalDetails.LastName
Label='LAST NAME'

PASSWORD:

Passwords.Password.Password
Label='PASSWORD'

Must be 6 or more characters and contain at least 1 number

DATE OF BIRTH:

PersonalDe PersonalDetails.BirthDa PersonalDetails.BirthDate.Year
Label='DAT Label='DATE OF BIRTH Label='DATE OF BIRTH'

Tell us - you'll get a birthday treat if you do

Labelling | Source | Upload

Name  my.asos.com.identity.reg
Language  en
user*  Turker-A1111111111111
Group

[Upload Completed Spec]

*FIG. 5J*

| Labelling | Source | Upload |
|---|---|---|
| Upload Complete! | | |

Name    my.asos.com.identity.reg
Language    en
user*    Turker-A1111111111111
Group Upload Completed Spec Signing up with social is super quick. No extra passwords to remember - no brain fail. Don't worry, we'd never share any of your data or post anything on your behalf #notev

————————— OR —————————

SIGN UP USING YOUR EMAIL ADDRESS

EMAIL ADDRESS:

ContactDetails.Emails.Email.Address
Label='EMAIL ADDRESS'

We'll send your order confirmation here

FIRST NAME:

PersonalDetails.FirstName
Label='FIRST NAME'

LAST NAME:

PersonalDetails.LastName
Label='LAST NAME'

PASSWORD:

Passwords.Password.Password
Label='PASSWORD'

Must be 6 or more characters and contain at least 1 number

SYSTEM, METHOD, AND COMPUTER PROGRAM FOR TESTING THE ACCURACY OF SOFTWARE THAT IDENTIFIES USER INTERFACE ELEMENTS ON A WEBPAGE

RELATED APPLICATION

This application is a continuation of U.S. patent application Ser. No. 17/566,233 titled "System, Method, and Computer Program for Testing the Accuracy of Software that Identifies User Interface Elements on a Webpage," which was filed on Dec. 30, 2021, the contents of which are incorporated by reference as if fully disclosed herein.

BACKGROUND OF THE INVENTION

1. Field of the Invention

This invention relates generally to programs accuracy testing and, more specifically, to a system and method for testing the accuracy of software that identifies user interface elements on a webpage.

2. Description of the Background Art

In the digital world we live in, software has permeated every aspect of our lives, whether the software is for productivity, health, security, education, recreation, or commerce. One essential functionality of any software is being able to recognize fields or text markers to identify what information corresponds with each. This is applicable both in auto-fill software (e.g., automatically filling in common information, such as first name, last name, email address, etc., into webform fields) and in cart-scraper software (e.g., identifying checkout cart information, which enables a user to perform a buy now/pay later transaction). In order to ensure the quality of such software, especially as the software is being applied to many new clients, there is a need to be able to continually evaluate and improve the accuracy of the software for all clients, including existing clients. While a person can sit in front of a website and use the software continuously to verify the accuracy of the software on that website, that is not efficient as there are thousands of websites. Therefore, there is a need for a computer to be able to independently and continually run the software and to quickly provide feedback with respect to all websites. By understanding a software's limitations, a software designer is able to investigate and make necessary corrections and only release a new version of software when the software designer can certify its accuracy as compared with the current live version.

SUMMARY OF THE DISCLOSURE

The present disclosure describes a system, method, and computer program for testing the accuracy of software that identifies user interface (UI) elements on a webpage. The method is performed by a computer system that includes servers, storage systems, networks, operating systems, and databases.

The present invention is directed to an internal process for 1) testing the accuracy of an auto-fill software to correctly recognize fillable fields on a webform (i.e., to recognize the fields that need to be recognized for a successful auto-fill transaction as well as ignore the fields that should be ignored) and 2) testing the accuracy of a cart-scraper software to correctly recognize applicable text markers for extracting checkout cart information. Related to the auto-fill software, this is done by providing a software tool that enables a user to tag webform fields with labels (including tagging fields that should be ignored), creating a normalized specification corresponding to each tagged webform, identifying inputs for use in benchmark testing, running the auto-fill software being tested on a set of webforms in a benchmarker testing environment, and displaying diagnostics. Related to the cart-scraper software, this is done by providing a software tool that enables a user to tag text markers on a webform (where the markers relate to checkout cart fields), create a specification corresponding to each tagged webform, identify inputs for use in benchmarker testing, run the version of the cart-scraper software being tested on the webforms, and display diagnostics.

In one embodiment, a method for testing the accuracy of software that identifies user interface elements on a webpage comprises the following steps:
  enabling a user to tag UI elements on a webpage with labels;
  creating a normalized specification for the webpage, wherein the specification includes a mapping of UI elements to normalized labels;
  using the auto-identifier software to identify UI elements on the webpage;
  evaluating the performance of the auto-identifier software with respect to the webpage using the specification; and
  displaying diagnostics related to the performance of the auto-identifier software.

BRIEF DESCRIPTION OF THE DRAWINGS

FIGS. 5A-5K are screenshots of an exemplary user interface, according to one embodiment, for how to create a normalized specification.

FIGS. 6A-6D are screenshots of an exemplary user interface, according to one embodiment, for how to test changes using a benchmarker.

DETAILED DESCRIPTION OF THE PREFERRED EMBODIMENTS

The present disclosure describes a system, method, and computer program for testing the accuracy of software that identifies user interface elements on a webpage. The method is performed by a computer system that includes servers, storage systems, networks, operating systems, and databases ("the system").

Example implementations of the methods are described in more detail with respect to FIGS. 1-6D.

1. METHOD FOR TESTING THE ACCURACY OF SOFTWARE THAT IDENTIFIES USER INTERFACE ELEMENTS ON A WEBPAGE

Figure 1:
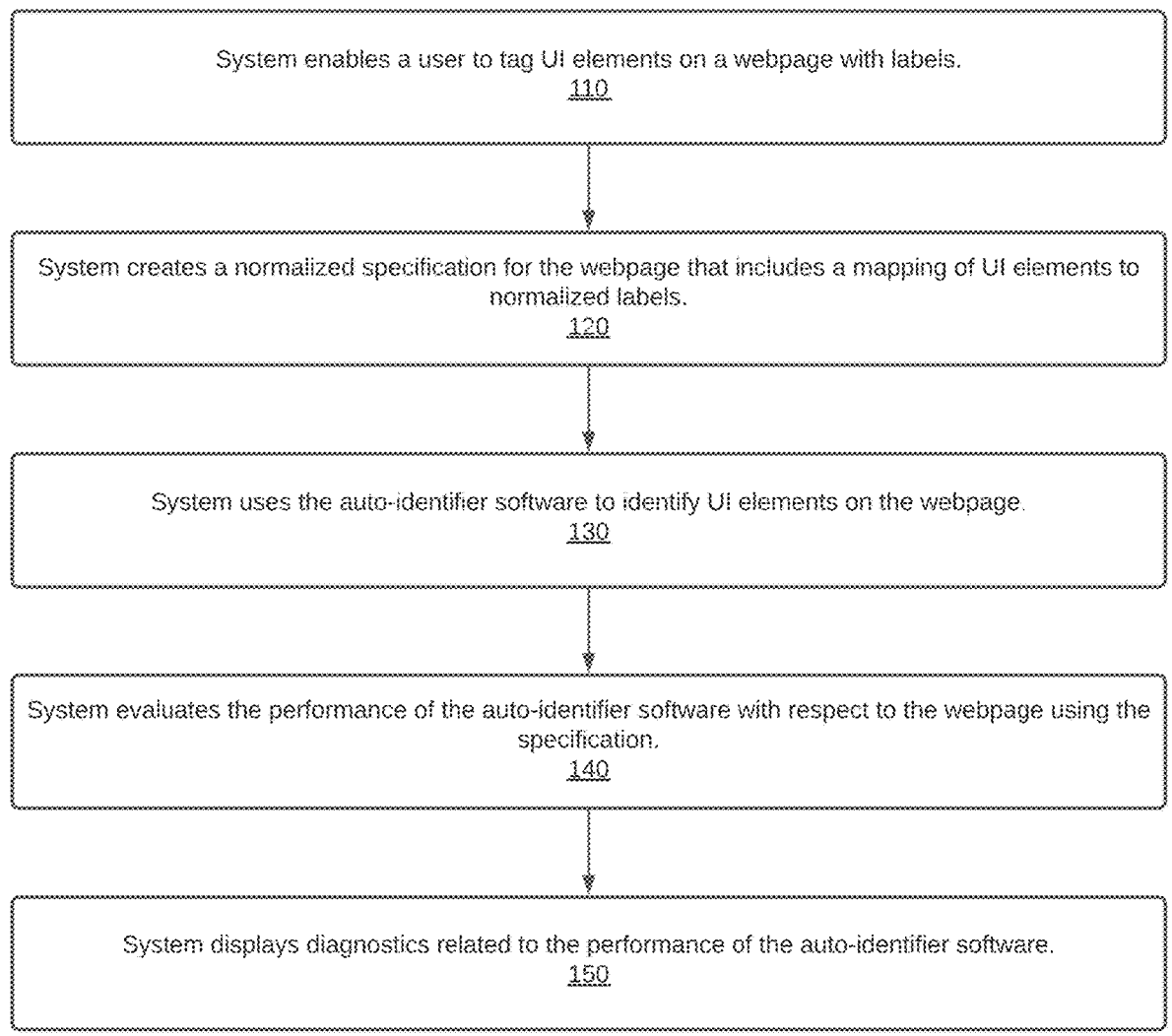
FIG. 1 is a flowchart that illustrates a method, according to one embodiment, for testing the accuracy of software that identifies user interface elements on a webpage.

FIG. 1 illustrates a method for testing the accuracy of software that identifies user interface (UI) elements on a webpage (i.e., "auto-identifier software"). In certain embodiments, the auto-identifier software may include both the client and server software working together. The system enables a user (e.g., an administrator, an employee, a contractor, etc.) to tag UI elements on a webpage with labels (step 110). In certain embodiments, the webpage is a webpage in a browser and a labeling tool is implemented as a browser extension. In certain embodiments, the webpage in the browser corresponds to a webview in a mobile application. In other words, a website may be structured differently between a webpage in a web browser and a webview in a mobile application. In order to test the accuracy of the webview in the mobile application, the webpage in the browser rearranges itself as if displaying the webview in the mobile application.

The system creates a normalized specification for the webpage that includes a mapping of UI elements to normalized labels (step 120). In certain embodiments, a specification is a representation of all possible UI elements on a webpage plus relevant metadata (i.e., not including metadata related to styling or behavior). For example, the metadata can include the placeholder of the field, the class name, the HTML ID, etc. In certain embodiments, one or more specifications are manually created by a user on a browser extension such that the one or more specifications are treated as the gold standard by which the information generated by the auto-identifier software is compared. In certain embodiments, the manually-created specification is created in two steps: first, by the browser extension automatically tagging fields with a label and, second, by a user correcting or adding one or more labels to their corresponding field(s) (e.g., using a "drag and drop" graphical user interface). The system uses the auto-identifier software to identify UI elements on the webpage (step 130). The system evaluates the performance of the auto-identifier software with respect to the webpage using the specification (step 140). The system displays diagnostics related to the performance of the auto-identifier software (step 150). In certain embodiments, the displayed diagnostics include the number of fields evaluated, the number of fields correctly or incorrectly identified (e.g., specification shows seven fields marked 1-7, but auto-identifier software identifies only six fields 1-6), the number of fields correctly or incorrectly filled (e.g., specification shows seven fields marked 1-7 and filled with a-g, auto-identifier software identifies seven fields marked 1-7, but field 3 is filled with "m" instead of "c"), and the number of fields correctly or incorrectly ignored, etc.

In certain embodiments, as discussed in greater detail in Section 2, the UI elements are fields, and the auto-identifier software is designed to automatically fill in fields in a webform. In certain embodiments, the webform is a checkout page. In certain embodiments, the specification for the webform includes a mapping of fields on the webform to normalized field labels. In certain embodiments, evaluating the performance of the auto-identifier software includes determining whether the auto-identifier software correctly identified and correctly filled the fields on the webform that the auto-identifier software is tasked with auto-filling and correctly ignored the fields on the webform that the auto-identifier software is not tasked with auto-filling.

In certain embodiments, as discussed in greater detail in Section 3, the UI elements are text markers, and the auto-identifier software is designed to automatically scrape checkout cart data from a webpage. In certain embodiments, the specification includes a mapping of cart data on the webpage to normalized labels.

In certain embodiments, displaying diagnostics includes displaying statistics regarding the performance of the autofill software on the webform. In certain embodiments, displaying diagnostics includes displaying statistics related to the performance of the software for a select UI element across a plurality of webpages. For example, the displayed statistics may be related to the percentage of correctly and incorrectly identified fields, correctly and incorrectly filled fields, and correctly and incorrectly ignored fields on the webform.

In certain embodiments, enabling a user to tag UI elements on a webpage includes providing a browser extension for a web browser that enables a user to tag UI elements on a webpage. In certain embodiments, the browser extension includes code that first automatically tags select UI elements with labels and then enables the user to edit the labels and tag additional UI elements.

2. METHOD FOR TESTING THE ACCURACY OF AUTOFILL SOFTWARE ON A WEBFORM

Figure 2:
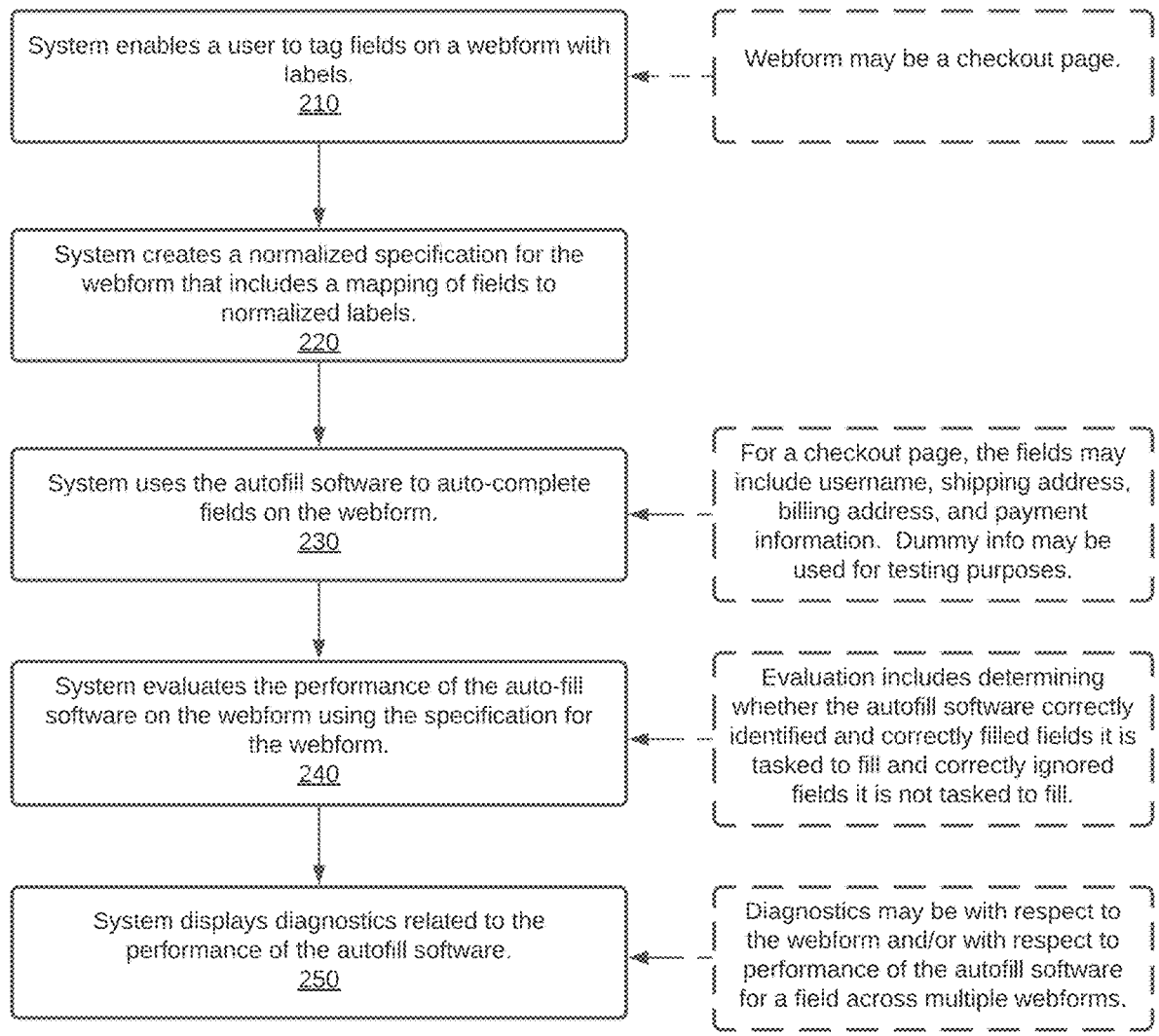
FIG. 2 is a flowchart that illustrates a method, according to one embodiment, for testing the accuracy of autofill software on a webform.

FIG. 2 illustrates a method for testing the accuracy of autofill software on a webform. The system enables a user to tag fields on a webform with labels (step 210). In certain embodiments, the webform may be a checkout page. The system creates a normalized specification for the webform that includes a mapping of fields to normalized labels (step 220). In certain embodiments, a specification is a representation of all possible fillable elements on a webpage plus relevant metadata related to making those elements fillable, minus any metadata from the webpage that is not related to making the elements fillable (including styling or behavior related metadata). The system uses the autofill software to auto-complete fields on the webform (step 230). For a checkout page, the fields may include: username, shipping address, billing address, payment information, etc. Dummy information may be used for testing purposes. Dummy information is any information that was created for testing purposes and does not correspond to an actual system user. The system evaluates the performance of the auto-fill software on the webform using the specification for the webform (step 240). This includes identifying the inputs necessary in the evaluation, such as the set of webforms, the corresponding specifications, and the version of the auto-fill software for testing. Evaluation also includes determining whether the autofill software correctly recognized fields it is tasked to fill and correctly ignored fields it is not tasked to fill. The system displays diagnostics related to the performance of the autofill software (step 250). In certain embodiments, the evaluation and, hence, the diagnostics may be with respect to the webform as a whole and/or with respect to performance of the autofill software for a field across multiple webforms.

3. METHOD FOR TESTING THE ACCURACY OF CART-SCRAPER SOFTWARE ON A CHECKOUT PAGE

Figure 3:
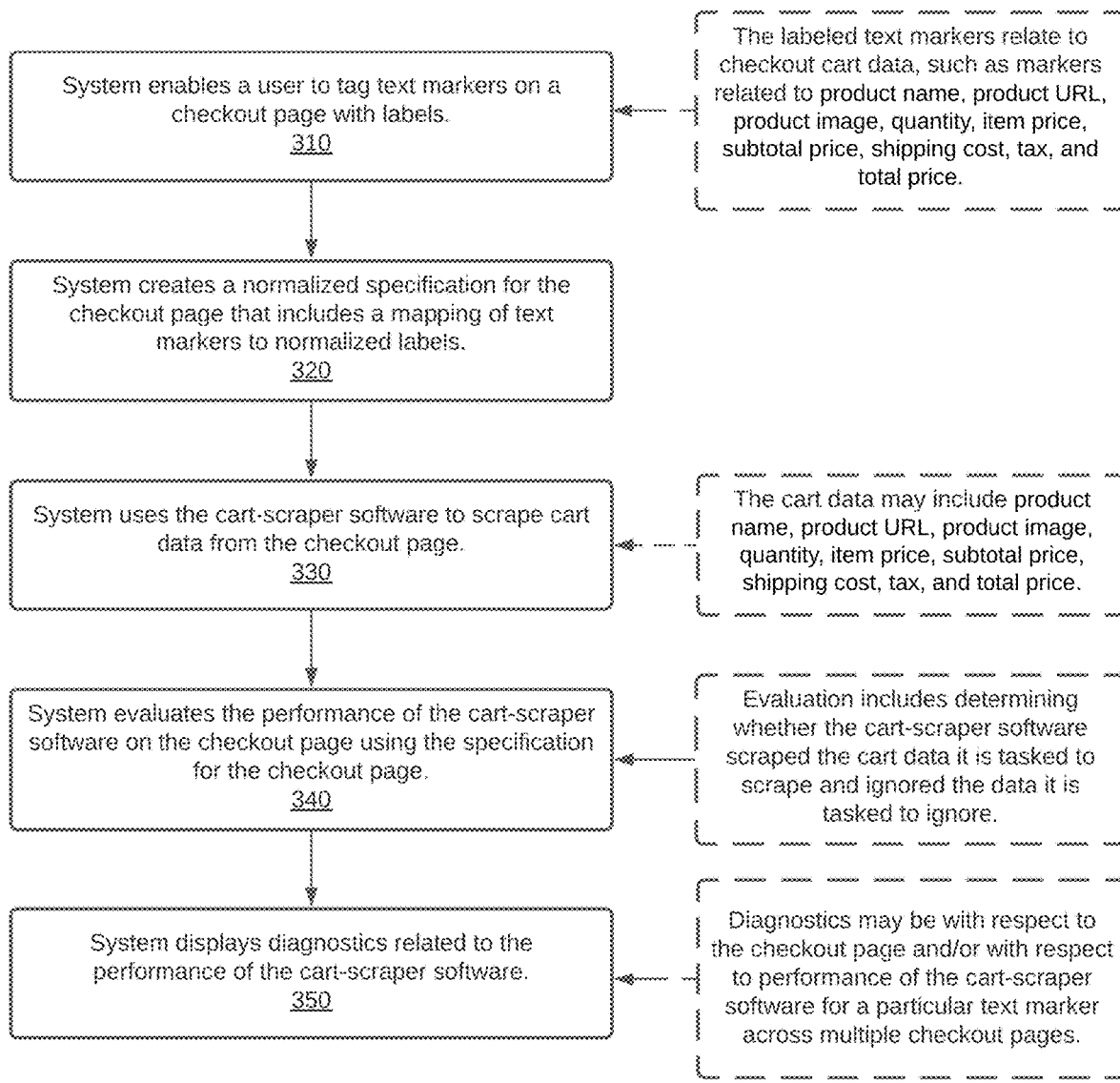
FIG. 3 is a flowchart that illustrates a method, according to one embodiment, for testing the accuracy of cart-scraper software on a checkout page.

FIG. 3 illustrates a method for testing the accuracy of cart-scraper software on a checkout page. The system enables a user to tag text markers on a checkout page with labels (step 310). The labeled text markers relate to checkout cart data, such as markers related to product name, product URL, product image, quantity, item price, subtotal price, shipping cost, tax, and total price. The system creates a normalized specification for the checkout page that includes a mapping of text markers to normalized labels (step 320). The system uses the cart-scraper software to scrape cart data from the checkout page (step 330). The cart data may include product name, product URL, product image, quantity, item price, subtotal price, shipping cost, tax, and total price. The system evaluates the performance of the cart-scraper software on the checkout page using the specification for the checkout page (step 340). This includes identifying the inputs necessary in the evaluation, such as the set of webforms, the corresponding specifications, and the version of the cart-scraper software for testing. Evaluation also includes determining whether the cart-scraper software scraped the cart data it is tasked to scrape and ignored the data it is tasked to ignore. The system displays diagnostics related to the performance of the cart-scraper software (step 350). In certain embodiments, the evaluation and, hence, the diagnostics may be with respect to the checkout page as a whole and/or with respect to performance of the cart-scraper software for a particular text marker across multiple checkout pages.

4. EXAMPLE SYSTEM ARCHITECTURE

Figure 4:
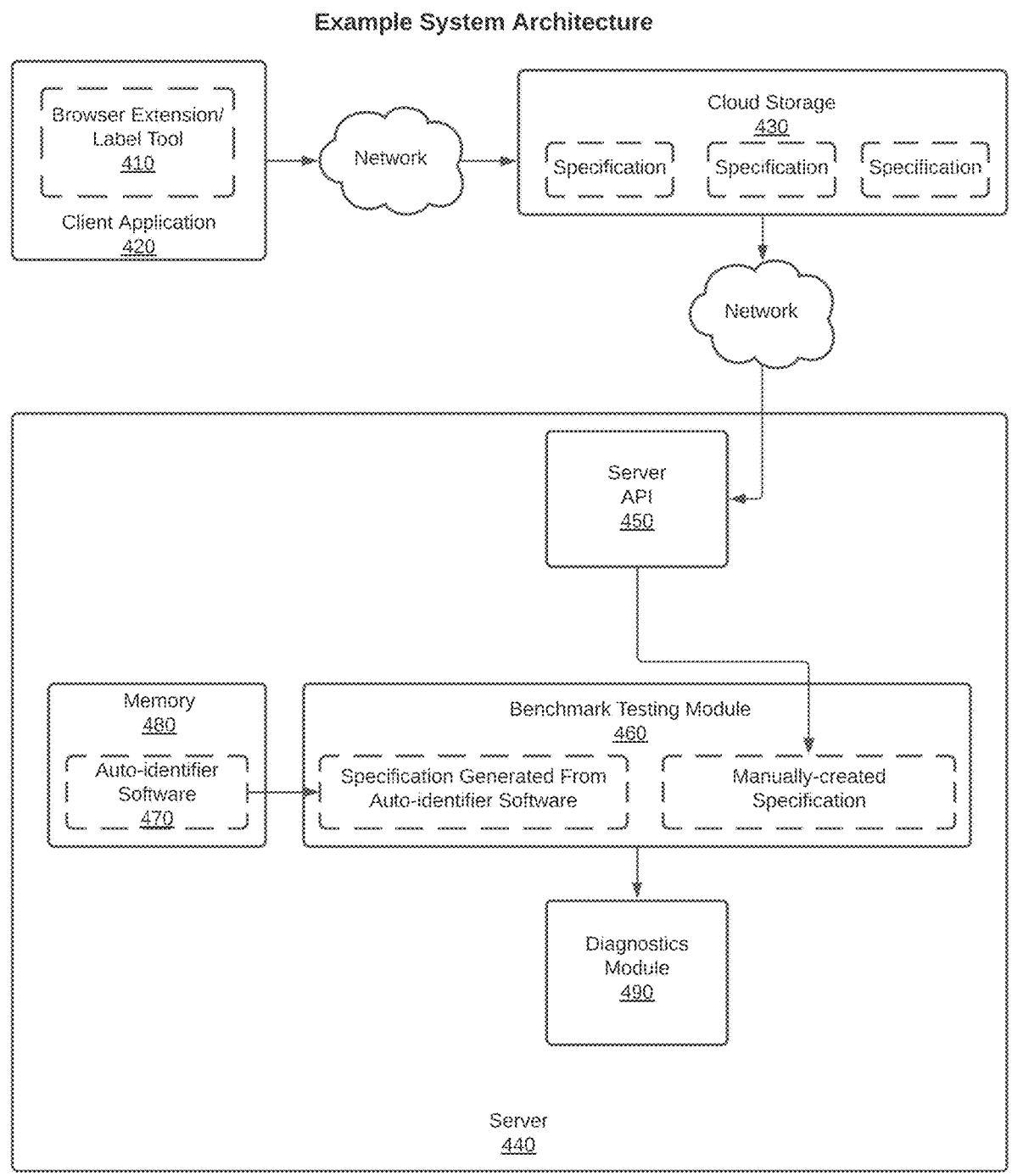
FIG. 4 is a block diagram that illustrates an example system architecture according to one embodiment.

FIG. 4 illustrates an example architecture for a system that performs the methods described herein. However, the methods described herein may be implemented in other systems and are not limited to the illustrated system.

FIG. 4 illustrates two independent processes. The first process is to create one or more manual specifications. The second process is to use a benchmark testing module (also referred to as a "benchmarker") to check the accuracy of software by comparing it to a manually-created specification downloaded from cloud storage. With respect to the first process, a user uses a browser extension/label tool 410 on a client application 420 on a client device to manually create one or more specifications based on the UI elements in a webpage. The one or more manually-created specifications are initially stored on the client device and then uploaded to cloud storage 430 (e.g., AMAZON WEB SERVICES), where each manually-created specification is tagged with the name of a merchant. During the second process, a manually-created specification is downloaded from the cloud storage 430 and compared to a specification generated from the auto-identifier software.

The second process takes place on a server 440, which has a server API 450 that downloads the manually-created specification to a benchmark testing module 460. The benchmark testing module 460 also receives a specification generated from the auto-identifier software 470 that is stored in memory 480 on the server 440. The auto-identifier software 470 copies the way the webpage works and attempts to create a specification based on the webpage. The benchmark testing module 460 compares the specification generated from the auto-identifier software against the manually-created specification, which is considered the gold standard specification, and provides diagnostic data via the diagnostic module 490. In certain embodiments, the diagnostic data includes which specifications generated from the auto-identifier software did not match a manually-created specification, and of those that did not match, which fields were not identified correctly.

5. EXAMPLE SCREENSHOTS OF USER INTERFACE FOR HOW TO CREATE A SPECIFICATION

FIGS. 5A-5K illustrate screenshots of an exemplary user interface for how to create a specification according to the present invention. A person skilled in the art would understand that the present invention may be embodied in other user interfaces having more or less functionality within the scope of the present invention. As such, FIGS. 5A-5K are intended to be illustrative and not limiting in any way.

Figure 5A:
Figure 5B:
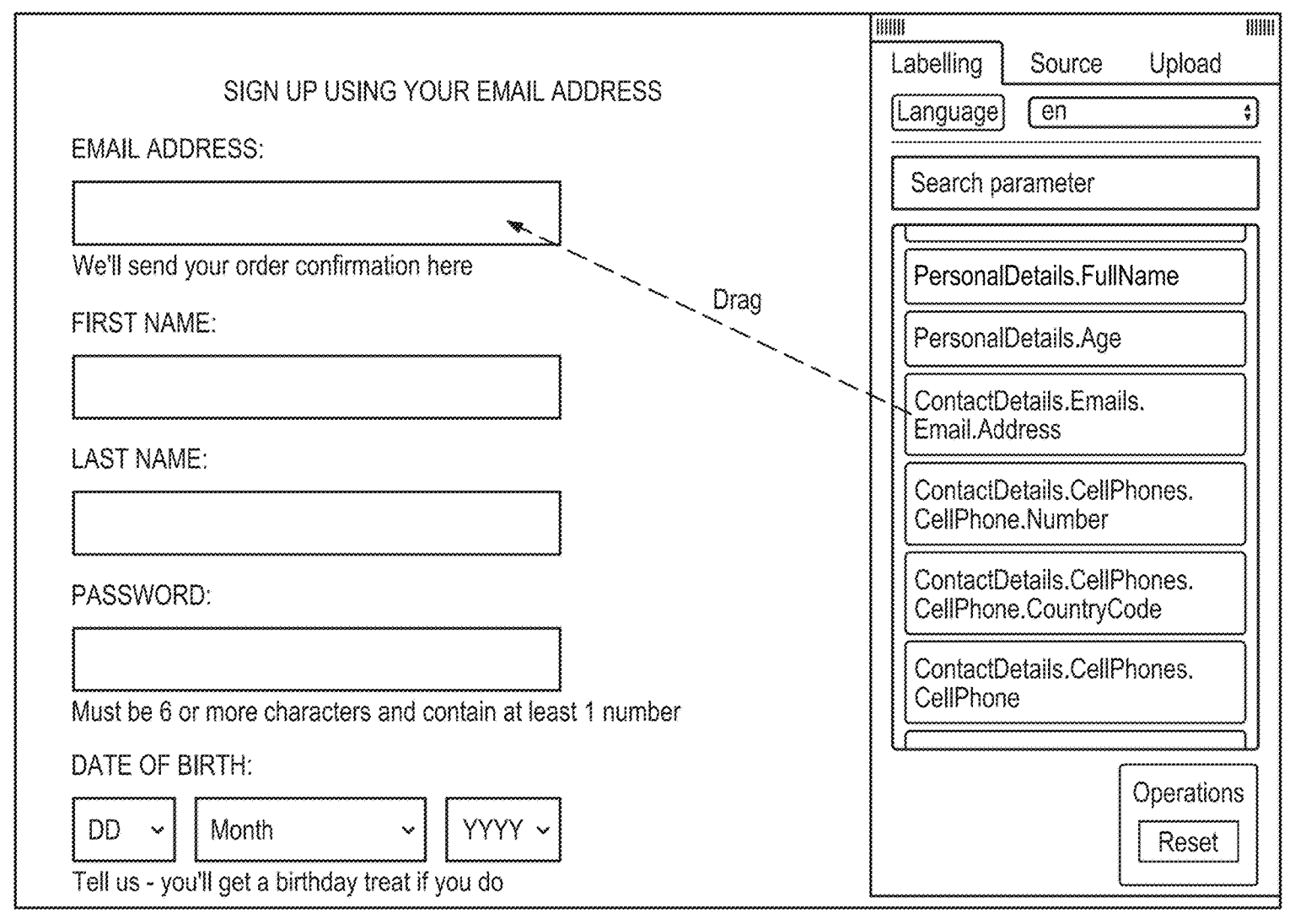
Figure 5C:
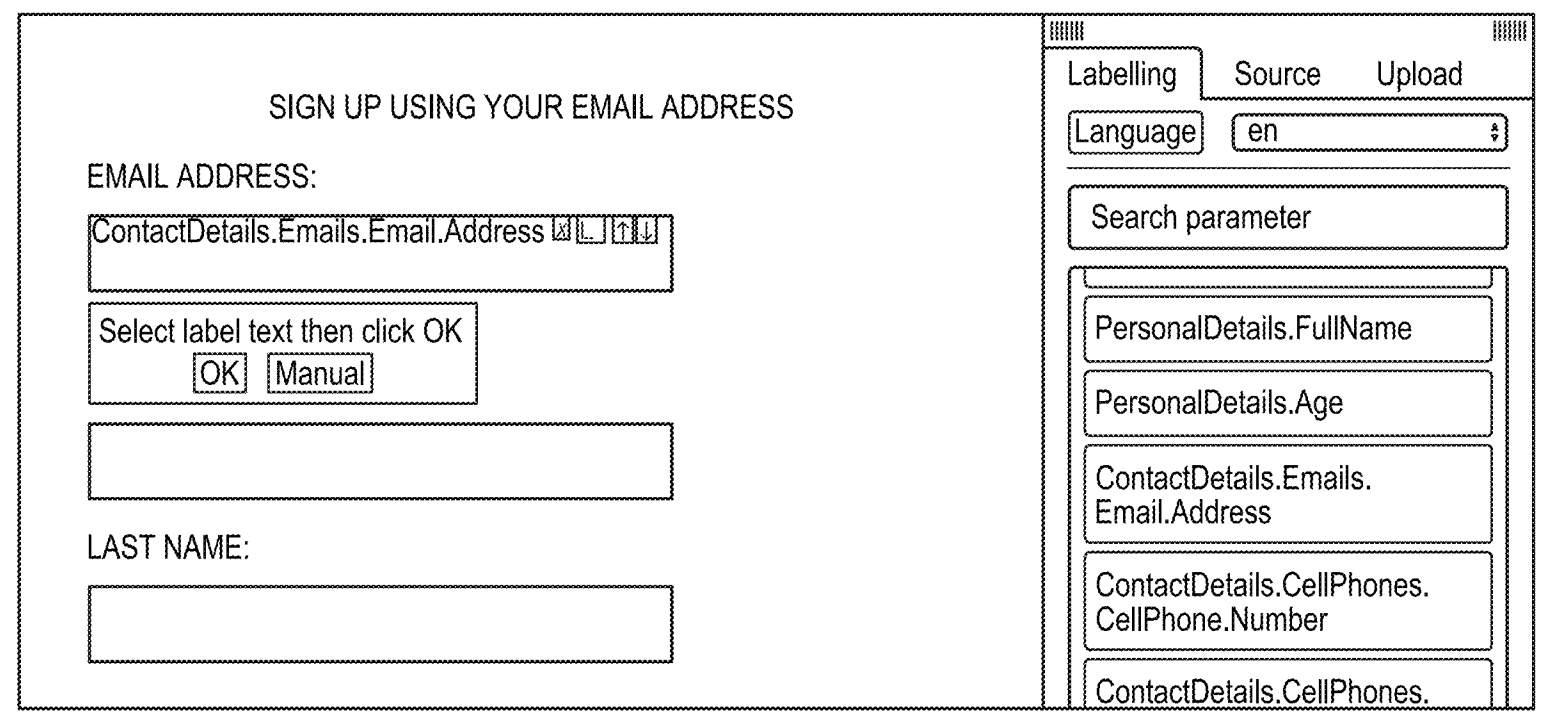

In FIG. 5A, the system provides a user interface that enables a user to select the language of the website for which the user is creating a specification. In the present example, the user selects English as the language of the website. In FIG. 5B, the user drags and drops a parameter to a field on the user interface. As seen in FIG. 5C, the parameter "ContactDetails.Emails.Email.Address" has been dragged and dropped into the field "Email Address."

Figure 5D:
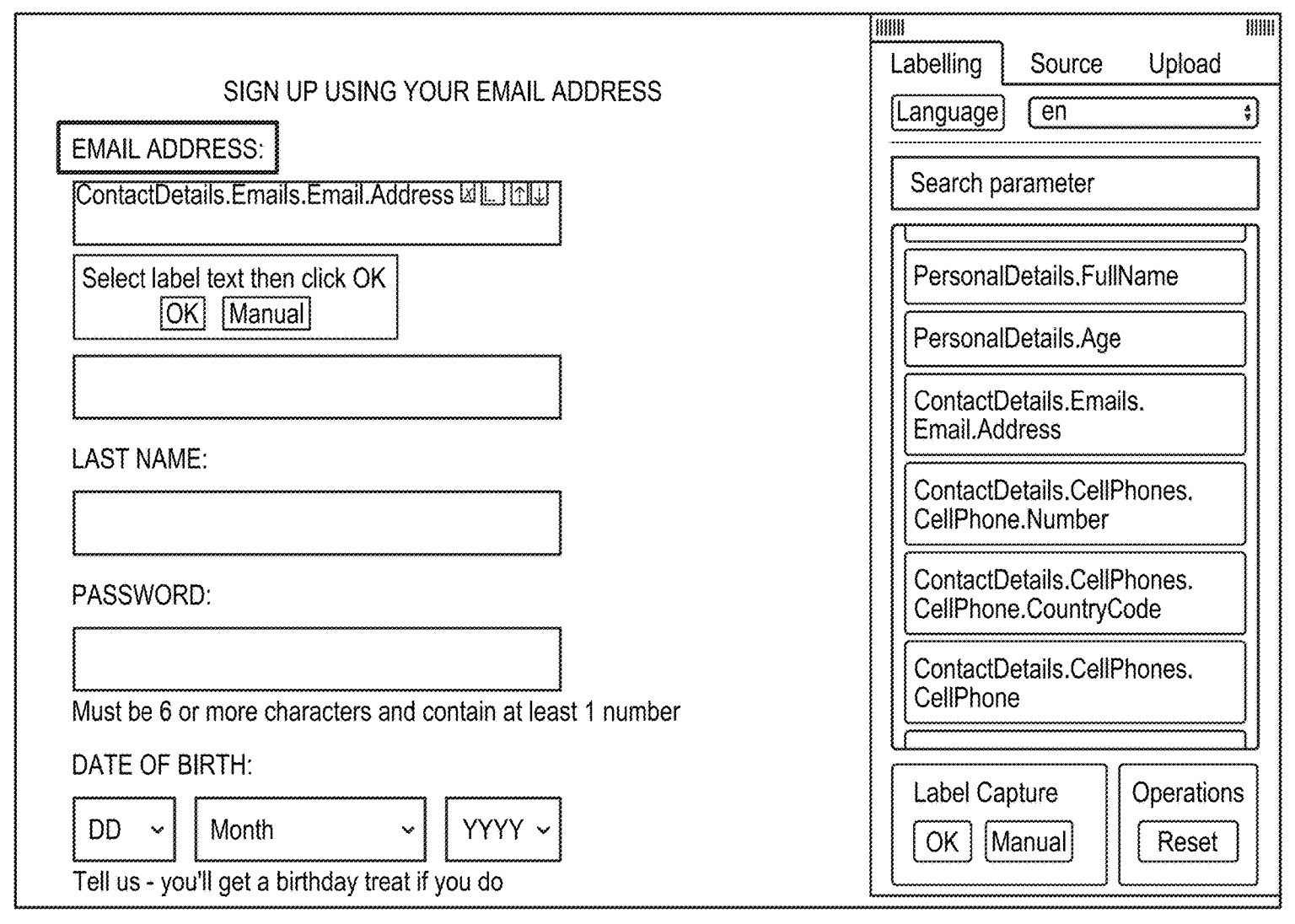
Figure 5F:
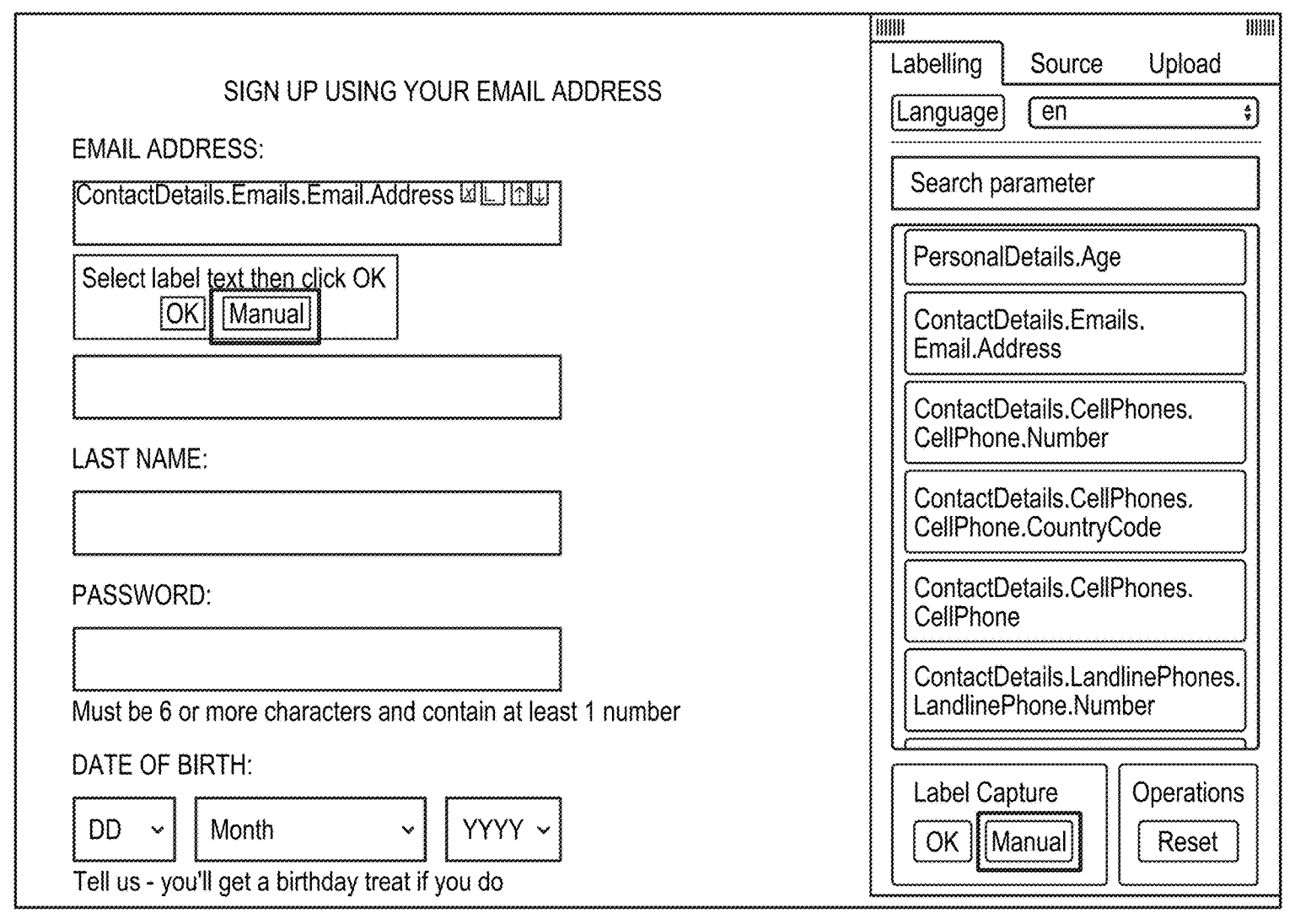
Figure 5G:
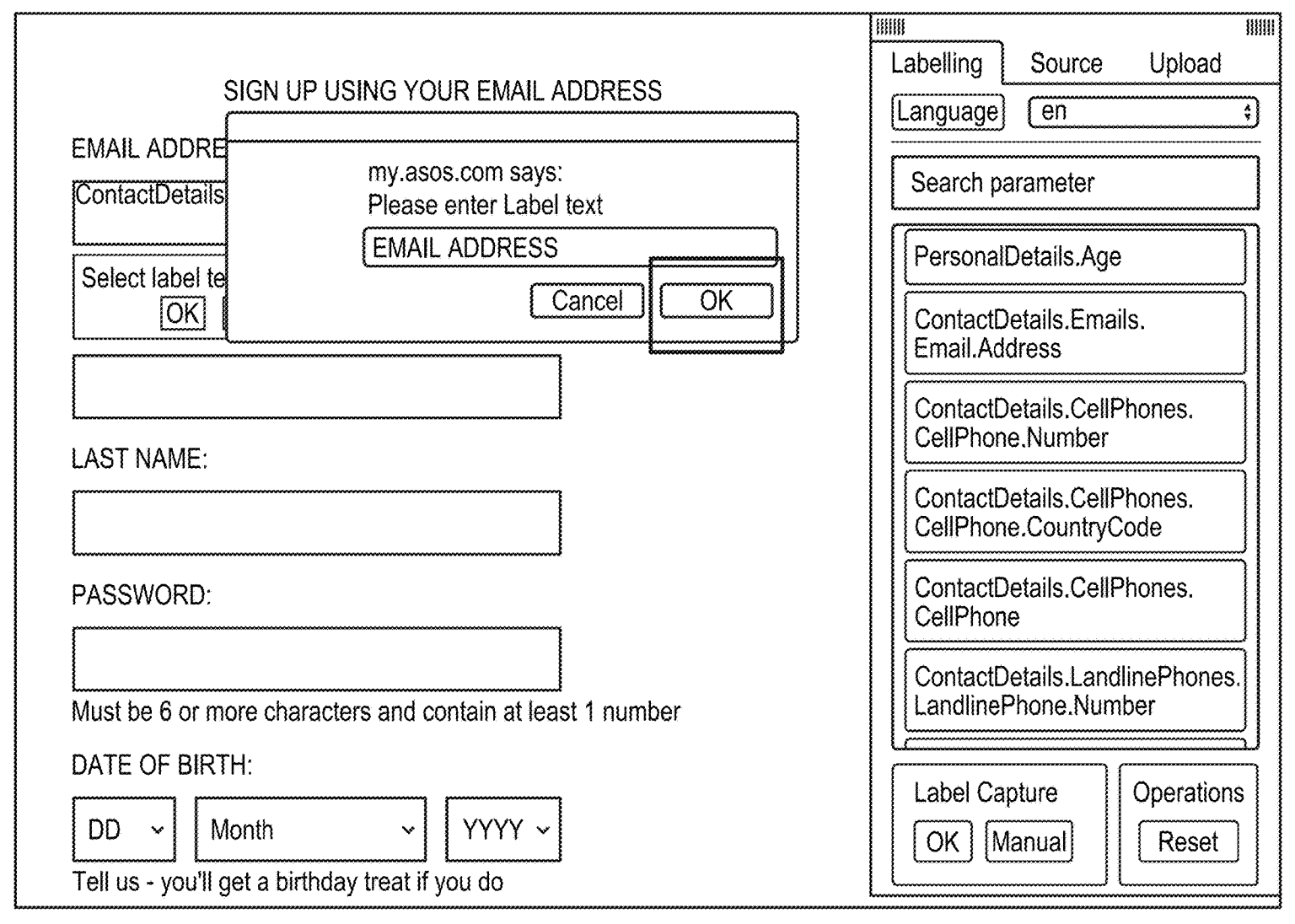
Figure 5I:
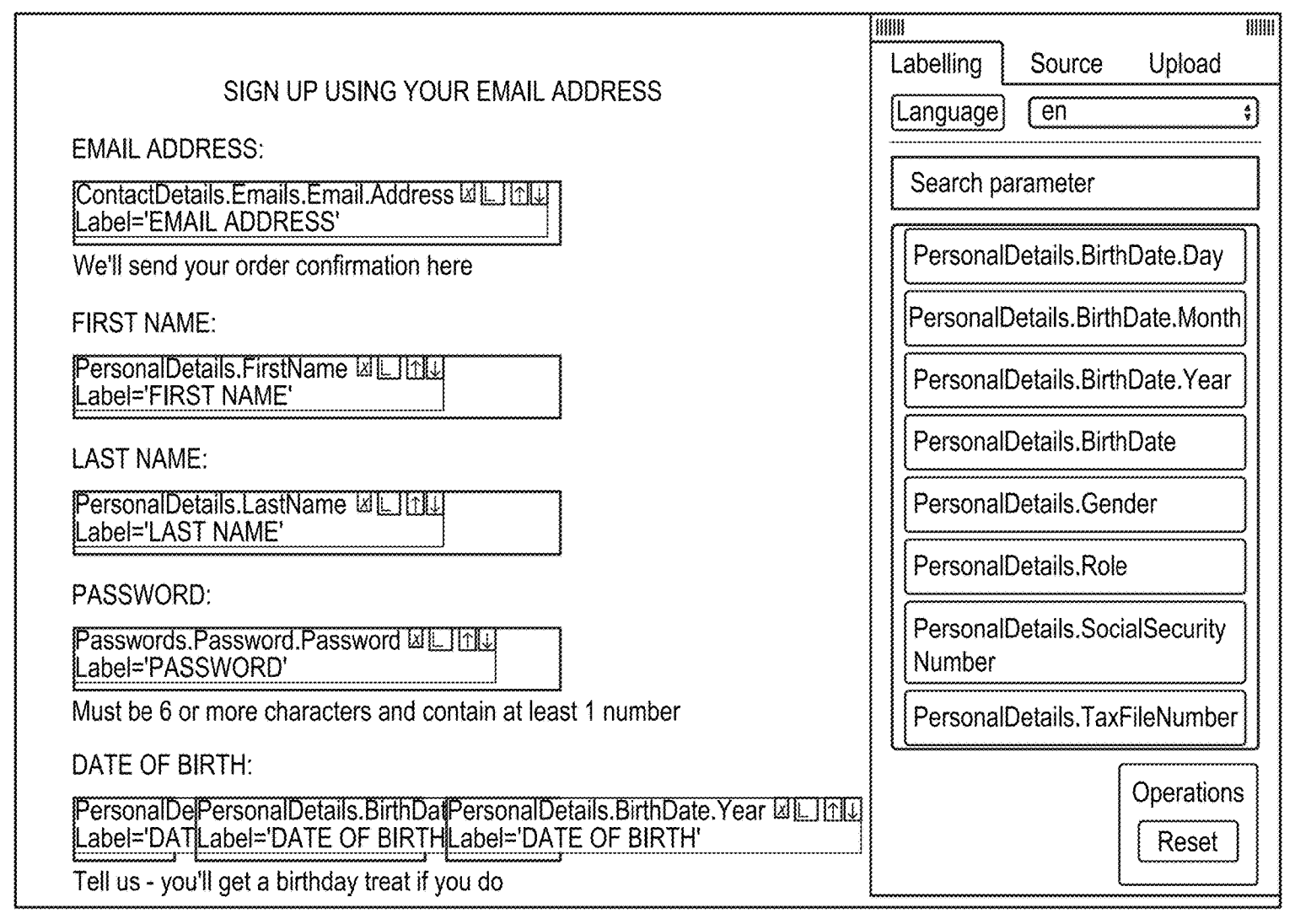

The next step is to add labels to the field. This can be done either by highlighting the label of the input field and allowing the system to capture the label or by manually inputting the label. As illustrated in FIGS. 5D and 5E, the user highlights the label of the input field (i.e., "Email Address") and confirms that the system should capture the label. As illustrated in FIGS. 5F and 5G, the user instead selects the option to manually input the label. As seen in FIG. 5G, a popup alert block appears as an overlay to the user interface and requests that the user input the name of the label. The user then inputs the name of the label and confirm the label. Once the system has received the label for the input field through either of the above methods, the user interface indicates that the field is a "spec field" by displaying the input field box in a green color with the parameter name and label as shown in FIG. 511.

As seen in FIG. 51, the user then repeats the above steps of dragging and dropping parameters and labeling fields for all fillable fields in the form, such that, once the entire form is completed, the form is considered a completed "spec" form. As seen in FIGS. 5J and 5K, once the form is a completed "spec" form, the user uploads the completed specification to a cloud storage and receives a confirmation that the upload was successful. The system also enables the user to make changes to a completed specification by uploading and overwriting a previous specification.

6. EXAMPLE SCREENSHOTS OF USER INTERFACE FOR HOW TO TEST CHANGES USING THE BENCHMARKER

FIGS. 6A-6D illustrate screenshots of an exemplary user interface for how to test changes using the benchmarker according to the present invention. A person skilled in the art would understand that the present invention may be embodied in other user interfaces having more or less functionality within the scope of the present invention. As such, FIGS. 6A-6D are intended to be illustrative and not limiting in any way.

Figure 6A:
Figure 6B:

In FIG. 6A, the user is preparing a new run of the benchmarker, which is a tool that performs a comparison between the "master" (i.e., manually-created specification) and the "benchmarker-flow-example-branch" (i.e., specification generated from the auto-identifier software) to determine whether there are any differences in the forms. The user inputs the parameters for the benchmark run, in this case, requesting all specifications in the Japanese language (i.e., "—lang ja"). As seen in FIG. 6B, the user specifies that the benchmark run be performed on two branches, the master branch and the benchmarker-flow-example branch, where the three fields, benchmarker, middleware, and widget, represent the three different directories in the code base for which changes can be made.

As seen in FIG. 6C, after confirming that the benchmark run should begin, the system runs the benchmark to compute the accuracy of the Japanese specification on the master branch and the benchmarker-flow-example-branch, and outputs the results. In this case, the accuracy of the benchmarker-flow-example-branch is lower than the master branch. As a result, the user may want to compare the two benchmark runs by clicking the compare option and make any necessary corrections.

FIG. 6D illustrates the differences between the two benchmark runs in terms of their mapping results, with the master branch benchmark run in the left column and the benchmarker-flow-example-branch benchmark run in the right column. Each row represents a unique field and a comparison of the mapping between the two branches. For example, for the parameter "ContactDetails.Emails.Email.Address," the master branch benchmark run mapped the field correctly as shown in green, whereas the benchmarker-flow-example-branch benchmark run mapped the field incorrectly as shown in red. The comparison process enables the user to determine whether any changes to an autofill software results in a net positive or net negative to the overall mapping accuracy.

7. GENERAL

The methods described with respect to FIGS. 1-6D are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for testing the accuracy of software that identifies UI elements on a webpage ("the auto-identifier software"), the method comprising:
enabling a user to tag UI elements on a webpage with labels, wherein the UI elements are checkout cart fields and wherein the auto-identifier software is designed to automatically scrape checkout cart data from a webpage;
creating and storing a normalized specification for the webpage, wherein the specification is created by a browser extension automatically tagging checkout cart fields with a label and a user correcting or adding one or more labels to their corresponding checkout cart field(s) to create and store a representation of all possible UI elements on the webpage plus relevant metadata in the specification, wherein the relevant metadata does not include metadata related to styling or behavior, and wherein the specification includes a mapping of UI elements to normalized labels;
using the auto-identifier software to identify UI elements on the webpage;
evaluating the performance of the auto-identifier software with respect to the webpage using the stored specification, wherein evaluating the performance of the auto-identifier software comprises determining whether the auto-identifier software scraped the cart data it is tasked to scrape and ignored the cart data it is tasked to ignore; and
displaying diagnostics related to the performance of the auto-identifier software, wherein displaying diagnostics comprises displaying statistics related to the performance of the software for a select UI element across a plurality of webpages.

2. The method of claim 1, wherein the auto-identifier software is also designed to automatically fill in fields in a webform.

3. The method of claim 2, wherein the webform is a checkout page.

4. The method of claim 2, wherein the specification for the webform includes a mapping of fields on the webform to normalized field labels.

5. The method of claim 2, wherein evaluating the performance of the auto-identifier software comprises determining whether the auto-identifier software correctly identified and correctly filled the fields on the webform that the auto-identifier software is tasked with auto-filling and correctly ignored the fields on the webform that the auto-identifier software is not tasked with auto-filling.

6. The method of claim 2, wherein displaying diagnostics comprises displaying statistics regarding the performance of the autofill software on the webform.

7. The method of claim 1, wherein the specification includes a mapping of cart data on the webpage to normalized labels.

8. The method of claim 1, wherein enabling a user to tag UI elements on a webpage comprising providing a browser extension for a web browser that enables a user to tag UI elements on a webpage.

9. The method of claim 8, wherein the browser extension includes code that first automatically tags select UI elements with labels and then enables the user to edit the labels and tag additional UI elements.

10. A non-transitory computer-readable medium comprising a computer program, that, when executed by a computer system, enables the computer system to perform the following steps for testing the accuracy of software that identifies UI elements on a webpage ("the auto-identifier software"), the steps comprising:
enabling a user to tag UI elements on a webpage with labels, wherein the UI elements are checkout cart fields and wherein the auto-identifier software is designed to automatically scrape checkout cart data from a webpage;
creating and storing a normalized specification for the webpage, wherein the specification is created by a browser extension automatically tagging checkout cart fields with a label and a user correcting or adding one or more labels to their corresponding checkout cart field(s) to create and store a representation of all possible UI elements on the webpage plus relevant metadata in the specification, wherein the relevant metadata does not include metadata related to styling or behavior, and wherein the specification includes a mapping of UI elements to normalized labels;
using the auto-identifier software to identify UI elements on the webpage;
evaluating the performance of the auto-identifier software with respect to the webpage using the stored specification, wherein evaluating the performance of the auto-identifier software comprises determining whether the auto-identifier software scraped the cart data it is tasked to scrape and ignored the cart data it is tasked to ignore; and displaying diagnostics related to the performance of the auto-identifier software, wherein displaying diagnostics comprises displaying statistics related to the performance of the software for a select UI element across a plurality of webpages.

11. The non-transitory computer-readable medium of claim 10, wherein the auto-identifier software is also designed to automatically fill in fields in a webform.

12. The non-transitory computer-readable medium of claim 11, wherein displaying diagnostics comprises displaying statistics regarding the performance of the autofill software on the webform.

13. A computer system for testing the accuracy of software that identifies UI elements on a webpage ("the auto-identifier software"), the system comprising one or more processors;

one or more memory units coupled to the one or more processors, wherein the one or more memory units store instructions that, when executed by the one or more processors, cause the system to perform the operations of:

enabling a user to tag UI elements on a webpage with labels, wherein the UI elements are checkout cart fields and wherein the auto-identifier software is designed to automatically scrape checkout cart data from a webpage;

creating and storing a normalized specification for the webpage, wherein the specification is created by a browser extension automatically tagging checkout cart fields with a label and a user correcting or adding one or more labels to their corresponding checkout cart field(s) to create and store a representation of all possible UI elements on the webpage plus relevant metadata in the specification, wherein the relevant metadata does not include metadata related to styling or behavior, and wherein the specification includes a mapping of UI elements to normalized labels;

using the auto-identifier software to identify UI elements on the webpage;

evaluating the performance of the auto-identifier software with respect to the webpage using the stored specification, wherein evaluating the performance of the auto-identifier software comprises determining whether the auto-identifier software scraped the cart data it is tasked to scrape and ignored the cart data it is tasked to ignore; and displaying diagnostics related to the performance of the auto-identifier software, wherein displaying diagnostics comprises displaying statistics related to the performance of the software for a select UI element across a plurality of webpages.

14. The computer system of claim 13, wherein the auto-identifier software is also designed to automatically fill in fields in a webform.

15. The computer system of claim 14, wherein displaying diagnostics comprises displaying statistics regarding the performance of the autofill software on the webform.

* * * * *